United States Patent
Goff et al.

(10) Patent No.: US 12,220,661 B1
(45) Date of Patent: *Feb. 11, 2025

(54) DIRECT CAPTURE OF CARBON DIOXIDE

(71) Applicant: 8 Rivers Capital, LLC, Durham, NC (US)

(72) Inventors: Adam Goff, Durham, NC (US); Damian Beauchamp, Hillsborough, NC (US); Jeremy Eron Fetvedt, Raleigh, NC (US); Miles R. Palmer, Durham, NC (US); Xijia Lu, Durham, NC (US); Daniel Rathbone, Durham, NC (US)

(73) Assignee: 8 Rivers Capital, LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/944,238

(22) Filed: Nov. 12, 2024

Related U.S. Application Data

(63) Continuation of application No. 17/781,943, filed as application No. PCT/IB2020/061455 on Dec. 3, 2020, now Pat. No. 12,172,127.

(60) Provisional application No. 62/942,902, filed on Dec. 3, 2019.

(51) Int. Cl.
*B01D 53/82* (2006.01)
*B01D 53/62* (2006.01)
*B01D 53/96* (2006.01)
*B01J 20/04* (2006.01)
*B01J 20/28* (2006.01)
*B01J 20/32* (2006.01)
*B01J 20/34* (2006.01)

(52) U.S. Cl.
CPC ............ *B01D 53/82* (2013.01); *B01D 53/62* (2013.01); *B01D 53/96* (2013.01); *B01J 20/041* (2013.01); *B01J 20/28033* (2013.01); *B01J 20/3236* (2013.01); *B01J 20/3297* (2013.01); *B01J 20/3433* (2013.01); *B01J 20/3483* (2013.01); *B01D 2251/404* (2013.01); *B01D 2251/604* (2013.01); *B01D 2257/504* (2013.01); *B01D 2258/06* (2013.01)

(58) Field of Classification Search
CPC ........ B01D 53/82; B01D 53/62; B01D 53/96; B01D 2251/404; B01D 2251/604; B01D 2257/504; B01D 2258/06; B01J 20/041; B01J 20/28033; B01J 20/3236; B01J 20/3297; B01J 20/3433; B01J 20/3483
USPC ........................................ 423/230
See application file for complete search history.

(56) References Cited

U.S. PATENT DOCUMENTS

| | | |
|---|---|---|
| 7,618,606 B2 | 11/2009 | Fan et al. |
| 7,655,069 B2 | 2/2010 | Wright et al. |
| 7,708,806 B2 | 5/2010 | Wright et al. |
| 7,879,139 B2 | 2/2011 | Anthony et al. |
| 7,896,953 B1 | 3/2011 | Goswami et al. |
| 8,083,836 B2 | 12/2011 | Wright et al. |
| 8,226,917 B2 | 7/2012 | Fan et al. |
| 8,273,160 B2 | 9/2012 | Wright et al. |
| 8,337,589 B2 | 12/2012 | Wright et al. |
| 8,500,855 B2 | 8/2013 | Eisenberger |
| 8,506,915 B2 | 8/2013 | Abanades Garcia et al. |
| 9,028,592 B2 | 5/2015 | Eisenberger |
| 9,266,052 B2 | 2/2016 | Wright et al. |
| 9,352,270 B2 | 5/2016 | Krutka et al. |
| 9,433,886 B2 | 9/2016 | Smedley et al. |
| 9,433,896 B2 | 9/2016 | Eisenberger |
| 9,616,378 B2 | 4/2017 | Eisenberger |
| 9,630,143 B2 | 4/2017 | Eisenberger et al. |
| 9,776,131 B2 | 10/2017 | Eisenberger |
| 9,861,933 B2 | 1/2018 | Wright et al. |
| 9,878,286 B2 | 1/2018 | Eisenberger |
| 9,925,488 B2 | 3/2018 | Eisenberger |
| 9,937,461 B2 | 4/2018 | Eisenberger et al. |
| 9,975,087 B2 | 5/2018 | Eisenberger |
| 10,239,017 B2 | 3/2019 | Eisenberger |
| 10,413,866 B2 | 9/2019 | Eisenberger |
| 10,512,880 B2 | 12/2019 | Eisenberger |
| 10,745,288 B2 | 8/2020 | Schlotterbach |
| 10,994,091 B2 | 5/2021 | McKenna et al. |
| 11,097,221 B2 | 8/2021 | Lu et al. |
| 11,229,879 B2 | 1/2022 | Lu et al. |
| 11,559,766 B2 | 1/2023 | Lu et al. |
| 11,655,421 B2 | 5/2023 | Heidel et al. |
| 11,738,307 B2 | 8/2023 | Materie |
| 2008/0289495 A1 | 11/2008 | Eisenberger et al. |
| 2009/0294366 A1 | 12/2009 | Wright et al. |
| 2018/0290892 A1 | 10/2018 | Misirian |

(Continued)

FOREIGN PATENT DOCUMENTS

| | | |
|---|---|---|
| WO | WO 2018/114526 | 6/2018 |
| WO | WO 2019/042158 | 3/2019 |

(Continued)

*Primary Examiner* — Edward M Johnson
(74) *Attorney, Agent, or Firm* — Womble Bond Dickinson (US) LLP

(57) ABSTRACT

Systems and methods for direct air capture of carbon dioxide or other gases utilize a calcium sorbent in a manner that allows for wide scale, relatively low cost implementation. In particular, a calcium sorbent may be provided as a substantially thin coating on one or more substrates and utilized for direct air capture of carbon dioxide through chemisorption. The carbonated sorbent may be disposed of for sequestration of the carbon dioxide or regenerated with capture of carbon dioxide released from the carbonated sorbent during the regeneration process.

21 Claims, 4 Drawing Sheets

(56) References Cited

U.S. PATENT DOCUMENTS

| | | |
|---|---|---|
| 2022/0111350 A1 | 4/2022 | Weissman et al. |
| 2022/0355244 A1 | 11/2022 | Van Dam et al. |
| 2023/0001351 A1* | 1/2023 | Goff .................. B01D 53/96 |
| 2023/0118894 A1 | 4/2023 | McKenna et al. |
| 2023/0226487 A1 | 7/2023 | Lu et al. |
| 2023/0249133 A1 | 8/2023 | Oloman |
| 2023/0257276 A1 | 8/2023 | Mehdipour |

FOREIGN PATENT DOCUMENTS

| | | |
|---|---|---|
| WO | WO 2020/094607 | 5/2020 |
| WO | WO 2022/049137 | 3/2022 |
| WO | WO 2022/187336 | 9/2022 |
| WO | WO 2022/192408 | 9/2022 |
| WO | WO 2023/147178 | 8/2023 |
| WO | WO 2023/165895 | 9/2023 |
| WO | WO 2023/165896 | 9/2023 |
| WO | WO 2023/166464 | 9/2023 |

* cited by examiner

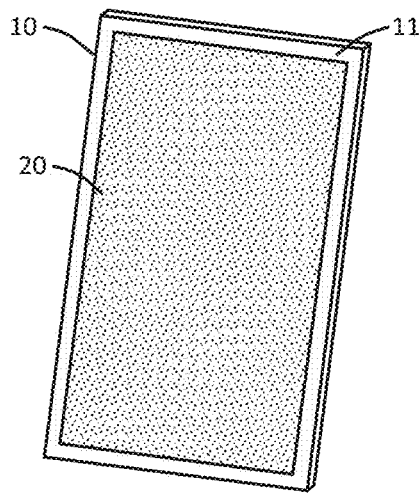
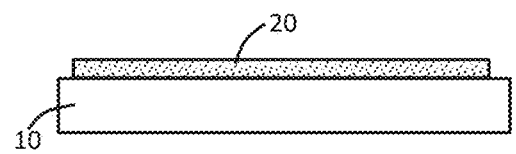
FIG. 1A  FIG. 1B
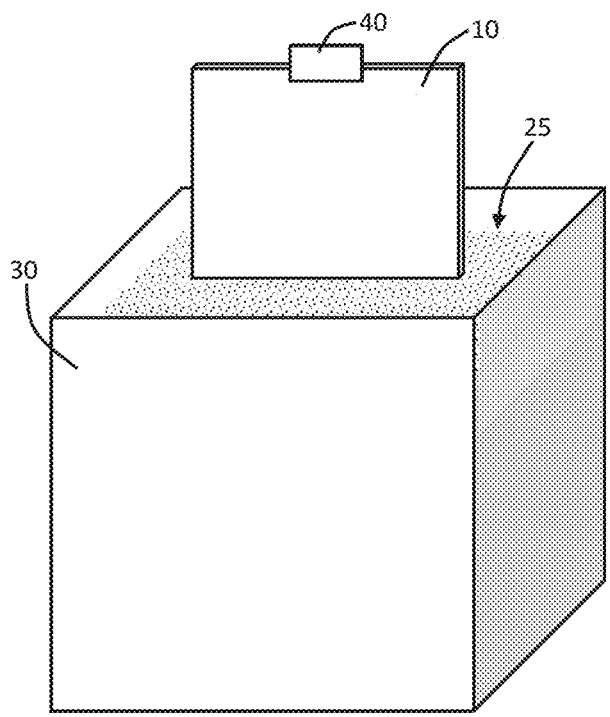
FIG. 2

DIRECT CAPTURE OF CARBON DIOXIDE

CROSS-REFERENCE TO RELATED APPLICATIONS

The present application is a continuation of U.S. patent application Ser. No. 17/781,943, filed Jun. 2, 2022, which is a U.S. National Stage of International Patent Application PCT/IB2020/061455, filed Dec. 3, 2020, and claims priority to U.S. Provisional Patent Application No. 62/942,902, filed Dec. 3, 2019. The disclosures of each of the applications noted above are incorporated herein by reference in their entirety.

FIELD OF THE DISCLOSURE

The present disclosure relates to systems and methods useful for capturing carbon dioxide. More particularly, the systems and methods can directly capture the carbon dioxide from air or another stream through use of a sorbent.

BACKGROUND

There is an ongoing effort worldwide to address increasing concentrations of greenhouse gases, particularly carbon dioxide ($CO_2$) in the atmosphere. Although much work has been done to decrease the amounts of such gases that are being released annually into the atmosphere, there is a growing understanding that decreased emissions alone may be insufficient to address concerns related to climate change. As such, current research is underway for methods for not only reducing greenhouse gas emissions but also for removing such gases that are already present in the atmosphere.

Wide scale deployment of current methods for capturing $CO_2$ from ambient air has been unsuccessful due at least in part to the excessive cost associated with known methods considering that global $CO_2$ emissions are on the scale of about 37 billion tons per year. Current $CO_2$ removal methods are saddled with high capital costs as well as high operating costs for various reasons. For example, since overall $CO_2$ concentrations in ambient air are very dilute relative to the main constituents (e.g., nitrogen, oxygen, and argon), previously identified removal methods have required high specificity and high efficiency in order to be cost effective. Even though high efficiency removal methods have been previously identified, such methods have lacked the capability to pass a sufficient volume of ambient air through the capture systems to make the known methods simple enough and sufficiently cost-effective for industrial scale implementation. As a prerequisite for achieving high efficiency, known removal methods have required the use of solvents and/or chemicals that are regenerable in order to offset the high cost of the necessary materials. Accordingly, such regenerable solvents and/or chemicals that have been used in known capture methods must be separated from the captured $CO_2$ for regeneration, and this separation requirement also adds additional cost and energy to the processes.

Although there is a strong desire worldwide to implement $CO_2$ removal technology as a means to combat climate change, unreasonably high costs have to date stood in the way of such implementation. Without an affordable technology for removing existing $CO_2$ from the atmosphere, the world will continue struggle to reduce and reverse anthropogenic global warming. Accordingly, there remains a need in the field for additional technologies effective for removal of greenhouse gases, including $CO_2$, from ambient air.

SUMMARY OF THE DISCLOSURE

In one or more embodiments, the present disclosure can provide systems and methods that are adapted to or configured to capture carbon dioxide directly from ambient air. Beneficially, the systems and methods can maximize the available surface area of a calcium sorbent to increase the amount of carbon dioxide that may be removed from ambient air. The present disclosure also can be effective for minimizing associated costs of an integrated production and logistics system with a passive air capture process while simultaneously mitigating the accumulation of carbon dioxide in the atmosphere.

The presently disclosed systems and methods can provide for highly efficient, direct removal of carbon dioxide from ambient air at a relatively low cost, particularly when compared to known carbon dioxide removal systems that require high-cost chemicals that must be continuously regenerated. More particularly, the present systems and methods can be adapted to or configured to accelerate carbonation of a calcium sorbent in ambient air, and this can be achieved in some embodiments through providing the sorbent on one or more substrates in a manner that maximizes available sorbent surface area and utilizes a designed thickness whereby the sorbent may carbonate both rapidly and thoroughly.

The use of calcium hydroxide for chemisorption of carbon dioxide from air has been previously proposed (see, "Carbon Dioxide Extraction From Air: Is It An Option?" Lackner, 1999, and "Liquid-Like $H_2O$ Adsorption Layers to Catalyze the $Ca(OH)_2/CO_2$ Solid-Gas Reaction and to Form a Non-Protective Solid Product Layer at 20° C." Beruto and Botter, 2000), but no known system has been shown effective in utilizing these properties for a viable direct air capture system with passive carbonation. Rather, previous systems have relied on active acceleration of direct air capture through carbonators, air contactors, additional solvents, pellet reactors, and additional heat and energy input. Such active processes, however, add significant cost and risk that is beneficially avoided by the presently disclosed systems and methods. Even known, passive calcium direct air capture systems (see Erans et al. 2019) have been unable to provide a practical, integrated system. For example, U.S. Pat. No. 10,570,018 discloses a passive calcium direct air capture system, but such system still fails to meet necessary requirements for practical implementation (i.e., does not allow for accelerated carbonation at a sufficiently low cost). All of these failures, however, may be overcome according to one or more embodiments of the presently disclosed systems and methods, which provide for accelerated carbonation at a sufficiently low cost for practical implementation.

The presently disclosed systems and methods for direct air capture of at least carbon dioxide (i.e., other pollutants may similarly be removed from ambient air using the present disclosure) overcomes several limitations in the known processes for removing carbon dioxide from air. For example, known processes require high efficiency, high speed sorbents/chemicals to rapidly remove carbon dioxide from ambient air. Because of the excessive material costs, such processes require efficient regeneration of the sorbents/chemicals. Likewise, in order to achieve rapid turnover, such processes require active air flow (e.g., using blowers) to achieve the rapid turnover. The presently disclosed systems and methods mitigate or completely overcome such limitations. As is further described herein, the present systems and methods allow for the use of sorbents/chemicals that are low cost but, due to the previously perceived limitations in efficiency, have been disregarded by the prior art for use in viable air capture systems. The lower cost sorbents/chemicals also allow for an integrated sorbent production and capture process. The present methods and systems likewise can be carried out efficiently without complete regeneration of the sorbents/chemicals. Further, the present methods and systems can be carried out in the express absence (if desired) of any forced air components (e.g., blowers) since high efficiency may be achieved even when a slower reaction time it utilized. More particularly, the present systems and methods provide form implementation of a high surface area configuration that achieves high efficiency absorption at low cost, even in the partial or complete absence of sorbent/chemical regeneration and even in the absence of applied, forced air components.

In one or more embodiments, the present systems and methods may incorporate the use of a passive calcium chemisorbent carbonation process. An example embodiment may utilize one or a plurality of circulating and/or stationary hanging substrates that can be randomly distributed or specifically organized within an enclosed, semi-enclosed, or covered structure. Circulating substrates in particular may utilize a vertical, horizontal, and/or passive conveyor system. The calcium sorbent may be provided substantially in a process-ready state—i.e., in a chemical state where the calcium sorbent is ready for undergoing a spontaneous or catalytically driven process to absorb carbon dioxide. In some embodiments, a calcium sorbent precursor may be treated to provide the process-ready material. For example, calcium carbonate ($CaCO_3$) may be subjected to calcining and slaking to form a calcium hydroxide slurry or suspension. Preferably, such processing is carried out with partial, substantially complete, or fully complete capture of any carbon dioxide driven from the calcium carbonate. Alternatively, or additionally, calcium oxide and/or calcium hydroxide may be provided from a further process wherein it was produced, preferably with the capture of any produced carbon dioxide.

The substrates can be coated with a relatively thin layer of the calcium hydroxide (or other calcium sorbent), which may be particularly in the form of a slurry or suspension. Such coating may be by any suitable means but particularly may be carried out as further described herein. After coating, the coated substrates can be positioned in a desired area of the structure and maintained substantially stationary. Alternatively, the coated substrates may be circulated throughout at least a portion of the structure. The coated substrates are subject to contact with ambient air for an amount of time sufficient for evaporation (i.e., release of $H_2O$ from the calcium hydroxide) and carbonation (i.e., uptake of $CO_2$ from the air) to proceed in a desired amount. The carbonated coating, having absorbed a content of carbon dioxide from the atmosphere, can be removed from the substrates, and the substantially cleaned substrates may be re-used. The removed coating may be exported from the site for use in different process, for an industrial use, for sale, and/or for sequestration. In some embodiments, the calcium sorbent can be regenerated for re-use. For example, the carbonated material may be subjected to further carbonation if desired prior to being processed through a calciner to drive off carbon dioxide, which can be captured for sequestration or other use (e.g., enhanced oil recovery). This calcination can also generate calcium oxide. Slaking may then be carried out to form calcium hydroxide to be coated on the substrates for further direct air capture of carbon dioxide.

A system according to the present disclosure may include any combination of individual components and/or units useful to carry out the process steps. For example, in some embodiments, a suitable system can comprise: a calciner that is preferably adapted to or configured to capture at least a portion, substantially all, or completely all of the carbon dioxide that is liberated in the calciner. The system likewise can include a slaker, a conveyor system (which may be adapted to or configured to operate with one or both of vertical and horizontal segments), and one or a plurality of substrates that are adapted to or configured to be suspended at least partially above floor level. The components of the system may be present with a single structure or a plurality of structures.

The foregoing systems and methods, which are described in greater detail below, provide distinct advantages over known uses of calcium sorbents for carbon dioxide capture. In particular, the present systems and methods provide for maximizing the surface area of the calcium sorbent, and thus also maximizing the carbonation efficiency of the calcium sorbent, while minimizing energy costs. In some embodiments, this can be achieved particularly by customizing the coating thickness of the sorbent on the substrate to elicit the most efficient rate of transfer of carbon dioxide into the sorbent. This specific design thus increases the performance and decreases the cost of the direct air capture system.

The present disclosure provides for even further advantages over known carbon dioxide capture systems. For example, passively capturing carbon dioxide with utilization of a high surface area sorbent as discussed herein can reduce, substantially eliminate, or completely eliminate the need for expensive equipment, such as an air contactor, a packed tower, fans, pumps and compressors, a carbonator, and/or a pellet reactor. This advantageous, high surface area arrangement can be achieved, in one or more embodiments, by utilization of relatively thin layers of the calcium sorbent on the one or more substrates that are used. An example embodiment of a suitable layer thickness can be in the range of about 1.5 kg or less of calcium sorbent per square meter of exposed area on the substrate. This thin layer can be arranged with a relatively high vertical density, such as being greater than five feet tall, while maintaining the thinness of each individual layer of the calcium sorbent. This combination of high surface area and low layer thickness can provide for direct air capture of carbon dioxide over a reasonable length of time (e.g., on the scale of several hours to months, depending upon the exact coating parameters and the desired process throughput) without requiring excessive land coverage. Moreover, this substrate-based deposition method allows for thinner application of calcium sorbent in a practical and efficient arrangement that solves at least some of the challenges and issues that have not been addressed by previous, passive direct air capture systems. Thus, the present systems and methods can significantly outperform faster, but more capital and energy intensive, direct air capture systems previously conceived while also providing efficiencies not previously attainable in previous, passive direct air capture systems.

Further to the above, the reduction or elimination of any active air capture mechanism also can reduce associated equipment and costs to produce the electricity and heat required to run such equipment. As a result, less carbon dioxide is produced in order to heat and run the capture system, and the net carbon removal of the present systems can significantly exceed that achievable by known systems and methods.

Used calcium sorbent (i.e., sorbent that has already been used to passively capture carbon dioxide) can be calcined in such a way as to separate the absorbed carbon dioxide for storage and thereby regenerate the calcium sorbent for further air capture. This regeneration reduces the need for limestone to produce calcium sorbent. Although calcination of calcium oxide (CaO) is a common process, its integration with the present passive, high density CaO carbonation process is effective to provide for a significant improvement in cost and energy use of the full cycle of sorbent use and regeneration compared to other direct air capture systems. Unlike previously described processes, the systems and methods of the present disclosure do not require additional chemicals or materials in the air capture stage that can complicate the calcination of the calcium sorbent after it has been utilized for carbon dioxide capture.

Previously disclosed processes for using calcium oxide or calcium hydroxide for direct air capture were unable to control the space and time required to scale up the process to an industrial level, even when passive systems were proposed. Calcium sorbents have been considered for direct air capture for approximately 20 years, but never has a system been developed that makes it feasible for that calcium to passively capture carbon dioxide at a useful scale. The present disclosure solves this challenge because of its full-system design for the application of a thin layer of sorbent to accelerate carbonation and a high density storage and logistics process that minimizes space and cost during the carbonation period, allowing for the passive direct air capture process to operate effectively at industrial scale.

In one or more embodiments, the present disclosure can particularly provide methods for direct air capture of carbon dioxide. In example embodiments, such methods can comprise: preparing a substantially continuous coating layer of a calcium sorbent material at a density of less than 10 kilograms per square meter on one or more substrates; subjecting the one or more substrates with the substantially continuous coating layer of the calcium sorbent material to contact with air including carbon dioxide for a time sufficient for the calcium sorbent to react with the carbon dioxide and thereby capture at least a portion of the carbon dioxide from the air and convert at least a portion of the calcium sorbent to a carbonated form; removing at least a portion of the calcium sorbent in the carbonated form from the one or more substrates; and processing the calcium sorbent in the carbonated form such that the carbon dioxide captured from the air is ready for sequestration or other use. In further embodiments, the methods can be further defined in relation to one or more of the following statements, which may be combined in any number and/or order.

The substantially continuous coating layer of the calcium sorbent material can be at a density of about 0.1 ksm to about 5 ksm.

The substantially continuous coating layer of the calcium sorbent material can have an average thickness on the one or more substrates of less than 2.5 cm.

The substantially continuous coating layer of the calcium sorbent material can have an average thickness on the one or more substrates of about 0.01 mm to about 2 cm.

The one or more substrates can be configured substantially as a sheet.

The substantially continuous coating layer of the calcium sorbent material can be configured to exhibit a carbonation rate such that at least 25% by weight of the calcium sorbent material is carbonated within a time of 96 hours or less.

The substantially continuous coating layer of the calcium sorbent material can be configured to exhibit a carbonation rate such that at least 50% by weight of the calcium sorbent material is carbonated within a time of about 1 day to about 14 days.

Subjecting the one or more substrates with the substantially continuous coating layer of the calcium sorbent material to contact with air including carbon dioxide can comprise hanging the one or more substrates with the substantially continuous coating layer of the calcium sorbent material in a location where the substantially continuous coating layer of the calcium sorbent material is in contact with the air.

Removing at least a portion of the calcium sorbent in the carbonated form from the one or more substrates can comprise subjecting the one or more substrates to a force sufficient to break the substantially continuous coating layer of the calcium sorbent material and loosen the substantially continuous coating layer of the calcium sorbent material from the one or more substrates.

Processing the calcium sorbent in the carbonated form can comprise particularizing the calcium sorbent in the carbonated form for sequestration of the calcium sorbent in the carbonated form.

Processing the calcium sorbent in the carbonated form can comprise further subjecting the calcium sorbent in the carbonated form to ambient air for a time sufficient to increase carbonation percentage.

Processing the calcium sorbent in the carbonated form can comprise: calcining the calcium sorbent in the carbonated form to release carbon dioxide therefrom and form calcium oxide; and capturing the carbon dioxide released from the calcium sorbent.

The method further can comprise slaking the calcium oxide to form the calcium sorbent material used in preparing the substantially continuous coating layer.

The method further can comprise removing a portion of the calcium sorbent in the carbonated form prior to calcining and adding makeup limestone during calcining.

Preparing the substantially continuous coating layer of the calcium sorbent material can comprise dipping the one or more substrates in a reservoir of the calcium sorbent material.

Preparing the substantially continuous coating layer of the calcium sorbent material can comprise dripping or spraying the calcium sorbent material onto the one or more substrates.

In one or more embodiments, the present disclosure further can particularly provide systems for direct air capture of carbon dioxide. In example embodiments, such systems can comprise: a coating system configured for application of a liquid, calcium sorbent material to one or more substrates to form a substantially continuous coating layer of the calcium sorbent material on the one or more substrates; a storage unit configured for positioning of the one or more substrates for a time wherein the one or more substrates are in contact with air such that carbon dioxide in the air reacts with the calcium sorbent material to form carbonated calcium sorbent material; and a collection unit configured for removal and collection of the carbonated calcium sorbent material from the one or more substrates. In further embodiments, the systems can be further defined in relation to one or more of the following statements, which can be combined in any number and/or order.

The coating system can comprise one or more reservoirs of the liquid, calcium sorbent material.

The coating system further can comprise a dipping unit configured for dipping of the one or more substrates into the one or more reservoirs of the liquid, calcium sorbent material.

The coating system can comprise a hanging unit configured for retaining the one or more substrates in a substantially vertical position.

The coating system further can comprise one or more drip pipes configured for dripping calcium sorbent material onto the one or more substrates.

The system further can comprise a calciner configured to receive the carbonated calcium sorbent material and convert the carbonated calcium sorbent material into calcium oxide and carbon dioxide.

The system further can comprise a solids separator configured to separate the calcium oxide from the carbon dioxide.

The system further can comprise a lime slaking unit configured to receive the calcium oxide and form calcium hydroxide for use as the calcium sorbent material.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise.

BRIEF DESCRIPTION OF THE FIGURES

FIG. 1A is an illustration of a substrate coated with a substantially continuous layer of a calcium sorbent material according to an example embodiment of the present disclosure.

FIG. 1B is a partial cross-sectional view of a substrate coated with a substantially continuous layer of a calcium sorbent material according to an example embodiment of the present disclosure.

FIG. 2 is an illustration of a substrate being dipped into reservoir containing a liquid calcium sorbent material so as to form a substantially continuous layer of the calcium sorbent material on the substrate according to an example embodiment of the present disclosure.

DETAILED DESCRIPTION

Figure 3:
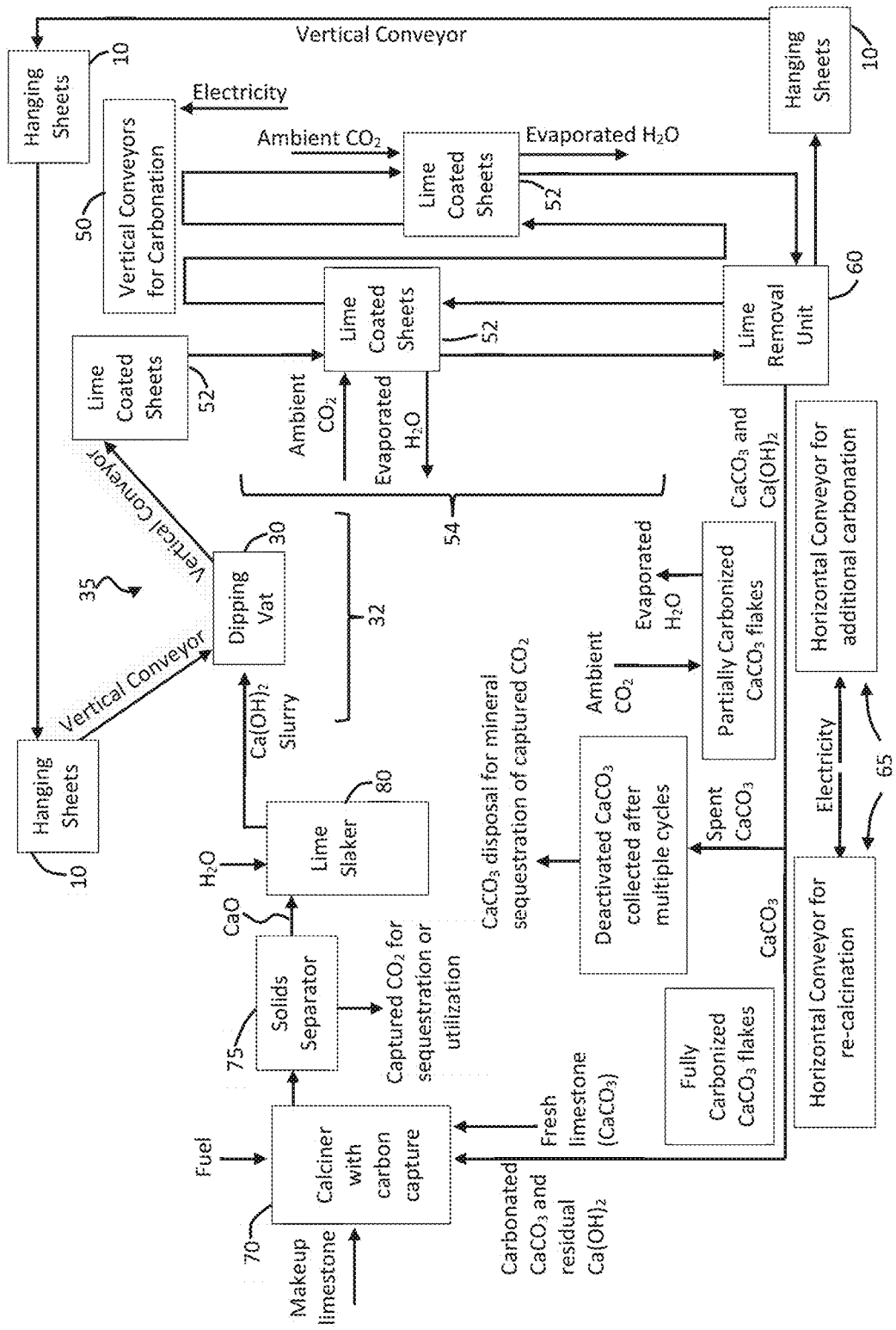
FIG. 3 is flowchart showing a system and method for direct air capture of carbon dioxide according to example embodiments of the present disclosure.

Various aspects of the present disclosure will now be described more fully hereinafter with reference to the accompanying drawings, in which some, but not all implementations of the disclosure are shown. Indeed, various implementations of the disclosure may be expressed in many different forms and should not be construed as limited to the implementations set forth herein; rather, these exemplary implementations are provided so that this disclosure will be thorough and complete, and will fully convey the scope of the disclosure to those skilled in the art. As used in the specification, and in the appended claims, the singular forms "a", "an", "the", include plural referents unless the context clearly dictates otherwise.

In one or more embodiments, the present disclosure provides systems and methods for direct capture of carbon dioxide from ambient air or atmospheric air. The systems and methods make use of a calcium sorbent that preferably is regenerable but that is configured for non-regenerable uses, if desired. In some embodiments, the calcium sorbent may be configured for undergoing cyclical carbonation and calcination such that carbon dioxide may be removed from the atmosphere through absorption by the sorbent and then captured during regeneration of the sorbent. As an example, calcium oxide and/or calcium hydroxide may be utilized as the calcium sorbent. The calcium sorbent thus can be adapted to or configured to absorb carbon dioxide from ambient air spontaneously or catalytically if desired. Such absorption can be effective to form a carbonated form of the calcium sorbent, and the carbonated form can then be regenerated through calcination to drive off the carbon dioxide, which can be captured in the calcination process.

To form the initial calcium sorbent and/or to regenerate a carbonated form of the calcium sorbent, a carbonate (e.g., calcium carbonate-$CaCO_3$) can be injected into a calciner that preferably can be equipped with appropriate components to capture at least a portion of the carbon dioxide that is driven off during calcination. The limestone utilized in forming the sorbent can be provided in a particulate form to ensure an entrained flow type, rotary kiln, or fluidized bed type calciner can be used for CaO production. In some embodiments, the particulate limestone/$CaCO_3$ can have an average size (e.g., the largest measurable dimension of length, width, or thickness for irregularly shaped particles) of about 1 µm to about 1 mm, about 5 µm to about 750 µm, or about 10 µm to about 500 µm. As further discussed below, the so-formed calcium oxide can be further treated prior to being applied to a substrate for use in the carbonation reaction.

The capture components associated with the calciner are preferably effective to capture at least 75%, at least 85%, at least 90%, at least 95%, at least 99%, or at least 99.9% of the carbon dioxide that is liberated from the carbonate during calcination. In some embodiments, calcination can be carried out by heating the carbonate to a temperature in the range of about 700° C. to about 1200° C., about 750° C. to about 1100° C., or about 800° C. to about 1000° C. Liberation of carbon dioxide can be effective to form calcium oxide (CaO). At least a portion of the carbon dioxide captured from calcination can be utilized for industrial processes, enhanced oil recovery, or sequestration. Non-limiting examples of capture technologies that may be implemented to capture the carbon dioxide released in calcination can include oxy-fired calcination, calcium based chemical looping, amine based solvent technologies and the like. Calcination for providing low-carbon CaO may be carried out on-site at the direct air capture facility and thus may be part of an integrated system for continuous or batch processing. If desired, calcination may be carried out off-site or by a third-party. As such, a content of the carbonate may be transported to the calcination site for regeneration of the calcium sorbent and carbon capture and then transported back to the direct air capture facility.

The CaO may remain in its dehydrated form, or it may be hydrated with water to form calcium hydroxide ($Ca(OH)_2$), or it may be a mixture of both, all of which are referred to as "calcium sorbent" or "lime sorbent" interchangeably. As such, a slaking unit may be used in addition to the calcining unit noted above in preparing the initial sorbent and/or for regenerating the sorbent from a carbonated product. This calcium hydroxide and/or CaO may be further mixed with additional water to provide the calcium sorbent in a suitable form for addition to the one or more substrates. The sorbent prior to addition to the substrate(s) thus may be in any one or more of a paste, slurry, spray, or suspension. In addition, in some embodiments, the calcium sorbent may be prepared in a polymeric form, as a metal organic framework (MOF), or another suitable mixture and/or molecular structure. The calcium sorbent is preferably provided in any suitable form whereby the calcium sorbent can capture carbon dioxide from ambient air. For example, calcium hydroxide can capture carbon dioxide from air when the relative humidity is above 40% since it is generally understood that the presence of water is key for calcium hydroxide to capture carbon dioxide yielding calcium carbonate. Carbon dioxide in the air can dissolve in water to form carbonic acid ($H_2CO_3$), which can dissociate into $HCO_3^-$; and $H^+$, thus allowing for the reaction with calcium to form calcium carbonate and capture carbon dioxide.

In some embodiments, the calcium sorbent added to the one or more substrates may comprise, consist essentially of, or consist of substantially only the calcium material itself and water. In other embodiments, however, one or more additional chemicals or materials may be included and may be adapted to or configured to improve the carbon dioxide chemisorption properties of the calcium sorbent and/or to improve the adhesion of the calcium sorbent to the substrate. Likewise, the calcium sorbent may be provided with specific morphologies that can be adapted to or configured to improve the carbon dioxide chemisorption properties of the calcium sorbent. Such improvements may include any one or more of, for example, reactivity, viscosity, porosity, surface area, morphological stability, and electronegativity, as well as other beneficial properties. In an example embodiment, sodium hydroxide in particular may be added into the sorbent. In other embodiments, potassium hydroxide, magnesium hydroxide, fumed silica, zeolites, magnetic particles, and/or recycled regenerated sorbent may be added. In addition to the above mixtures, the calcium sorbent may be formed as powders, pellets, flakes, slurries, gels, honeycombs, and/or may be provided in other beneficial geometries. Aging, drying, rehydrating, flexure, flow, vibration, rolling, squeezing, charging, and other such manipulations may be applied to the sorbent, as they have been demonstrated to impact the reactivity and performance of calcium sorbents as applied to the one or more substrates.

Application of the calcium sorbent to the substrate(s) can be carried out in a coating unit or facility. The calcium sorbent in a composition and/or form as described above can be applied onto one or more substrate(s) in a relatively thin layer. For example, average sorbent layer thickness across a representative area of the substrate can be less than 2.5 cm, less than 2 cm, less than 1.5 cm, or less than 1 cm (e.g., down to a minimum thickness coating achievable by conventional coating methods). In some embodiments, average layer thickness can be in the range of about 0.01 mm to about 2.25 cm, about 0.01 mm to about 2 cm, about 0.01 mm to about 1.5 cm, about 0.01 mm to about 1 cm, about 0.01 mm to about 7 mm, about 0.01 mm to about 5 mm, about 0.02 mm to about 1 mm, or about 0.03 mm to about 0.5 mm. While the foregoing ranges relate to a variety of useful embodiments according to the present disclosure, it is understood that more specific ranges may be implemented based upon the exact physical nature of the sorbent coating material. For example, in some embodiments, the calcium sorbent material may be provided in a substantially porous form that provides increased surface area for reacting with carbon dioxide. In such embodiments, relatively thicker coating layers may be utilized while still providing for high carbonation percentage, as further discussed below. For example, where a relatively thicker coating layer is utilized, the average layer thickness can be in the range of about 0.5 mm to about 2.25 cm, about 0.75 mm to about 2 cm, about 1 mm to about 1.5 cm, or about 1.5 mm to about 1 cm. In further example embodiments, relatively thinner coating layers may be utilized and can further simplify the process in that additional processing (e.g., to achieve a high porosity, as noted above) can be avoided, and a substantially continuous coating layer can be applied in a relatively small average thickness while still achieving desired carbonation percentages. In such embodiments, where a relatively thinner coating layer is utilized, the average layer thickness can be in the range of about 0.01 mm to about 2 mm, about 0.05 mm to about 1.5 mm, or about 0.1 mm to about 1 mm. The average thickness can relate to a single layer of the calcium sorbent or may be the total thickness of a plurality of layers applied to the substrate (e.g., 2, 3, 4, or 5 layers). FIGS. 1A and 1B illustrate a representative substrate 10 with a coating 20 of the calcium sorbent applied thereto. As seen in FIG. 1A, the coating 20 may cover less than all of a surface 11 of the substrate 10, but the coating may cover substantially all of the surface if desired. As seen in FIG. 1B, the coating 20 may have a thickness that is less than a thickness of the substrate; however, substrate thickness may vary based upon the specific material used to form the substrate.

Preferably, average sorbent layer thickness is adapted to or configured to provide a calcium sorbent density within a defined range. As above, a useful calcium sorbent density may vary based upon the average layer thickness that is utilized. Over all desired ranges, calcium sorbent density may be in a range such as about 10 kg per square meter (ksm or less), less than 5 ksm, less than 2 ksm, or less than 1 ksm of exposed substrate area (e.g., to a minimum of at least 0.02 ksm). In some embodiments, calcium sorbent density on the substrate can be in the range of about 0.05 ksm to about 10 ksm, about 0.1 ksm to about 5 ksm, about 0.2 ksm to about 2 ksm, or about 0.25 ksm to about 1 ksm. Layer thickness may be managed using various mechanisms, such as controlling the content of water that is mixed with the calcium sorbent to form the coating mixture. This (or other factors) can be utilized to control coating mixture viscosity and thus control the coating thickness of the coating mixture. In some embodiments, this relatively thin nature of the calcium sorbent layer can be particularly effective to allow for passive capture of carbon dioxide. While calcium oxide will capture carbon dioxide at ambient conditions, the reaction is rate limited by coating thickness, and substantially thick layers will essentially cease reactivity below a certain depth. In some embodiments, however, coating layer thickness can be increased by controlling one or more physical properties of the coating layer. For example, coating thicknesses in the higher ends of the aforementioned ranges may be particularly useful when the coating layer is provided in a relatively high porosity form. Similarly, the substrate may be provided with a three-dimensional structure that allows for greater layering of the sorbent thereon. In an example embodiment, the calcium sorbent may be prepared substantially in the form of a foam exhibiting at least a partial, open-cell structure effective to allow air to penetrate deeper into the layer thickness for reaction of carbon dioxide in the air with the sorbent.

The present systems and methods may be operated within defined carbonation rates for the sorbent. In some embodiments, the carbonation rate may be maximized so that about 50% or greater, about 60% or greater, about 70% or greater, or about 80% or greater of the sorbent by weight is carbonated before removal therefrom from the substrate(s). For example, removal of the carbonated substrate may take place upon achieving about 60% to about 98%, about 65% to about 95%, or about 75% to about 90% by weight carbonation of the sorbent. Such high levels of carbonation would not be expected to be achievable through optimization of known processes since known processes have either required the use of other types of sorbents/chemicals or are configured for use with sorbents that are not capable of achieving such high levels of carbonation due to structural limitations (e.g., required sorbent layer thickness). In other embodiments, when a high throughput process is desired, carbonation percentage may be minimized to increase throughput in the system. For example, removal of the carbonated substrate may take place upon achieving about 25% to about 75%, about 30% to about 65%, or about 35% to about 60% by weight carbonation of the sorbent. By utilizing such concentration limits, turnover of the sorbent may be increased so that the total mass of carbon dioxide that may be removed by a given system may be maximized. This is because the chemisorption rate may be significantly faster at lower carbonation percentages for the sorbent, and the carbonation rate may significantly slow as the relative percentage of the sorbent that has been carbonated increases.

Through application of defined calcium sorbent coating layer thicknesses, coating layer density, and desired carbonation percentage, the calcium sorbent layers applied to one or more substrates may be configured to or adapted to provide a carbonation rate within defined parameters. Such carbonation rate would not be expected to be inherent to the calcium sorbent since the carbonation rate will be a function of the above-noted factors. In some embodiments, the calcium sorbent coating formed on the one or more substrates can be configured to or adapted to exhibit a carbonation rate such that at least 25%, at least 30%, at least 35%, at least 40%, or at least 45% by weight of the calcium sorbent coating is carbonated within a time of 96 hours or less, 84 hours or less, 72 hours or less, 60 hours or less, 48 hours or less, 36 hours or less, or 24 hours or less (e.g., with a minimum carbonation time of 1 hour). More particularly, the calcium sorbent coating formed on the one or more substrates can be configured to or adapted to exhibit a carbonation rate such that about 25% to about 50%, about 25% to about 45%, or about 30% to about 45% by weight of the calcium sorbent coating is carbonated within a time of about 2 hours to about 96 hours, about 4 hours to about 84 hours, about 6 hours to about 72 hours, about 8 hours to about 60 hours, about 10 hours to about 48 hours, or about 12 hours to about 36 hours. Such carbonation rates can be achieved through control of one or more of the factors discussed above so that a relatively high throughput system and method may be achieved. This can be advantageous when the calcium sorbent will be regenerated, and such high throughput can increase the overall volume or mass of carbon dioxide removed from the air over a given time period.

In some embodiments, it may be desirable to provide for more complete carbonation of the calcium sorbent coating layer prior to removing the coating layer from the substrate. Such embodiments can be advantageous when the carbonated calcium sorbent will not be regenerated (i.e., will be sequestered in the form of calcium carbonate that is removed from the substrate without calcining to release the carbon dioxide) or where space for the system is sufficiently large to allow for longer carbonation times. Accordingly, in such embodiments, the calcium sorbent coating formed on the one or more substrates can be configured to or adapted to exhibit a carbonation rate such that at least 50%, at least 60%, at least 70%, at least 80%, or at least 90% by weight of the calcium sorbent coating is carbonated within a time of about 0.5 days to about 14 days, about 1 days to about 12 days, about 1.25 days to about 10 days, or about 1.5 days to about 8 days. Evaluating carbonation rate can be carried out by taking samples of the calcium sorbent coating at various times after formation of the coating layer and carrying out chemical analysis of the sorbent (e.g., via mass spectrometry or similar analytical method effective for identifying chemical composition).

Application of the calcium sorbent to one or more substrates may be achieved in any one or a combination of suitable methods. In some embodiments, the application may be accomplished by dipping a substrate directly into the calcium sorbent or spraying the calcium sorbent onto the substrate. In other embodiments, the application may be accomplished by using a brush, doctor blade, blowing mechanism, dripping, pouring, or any such method that is suitable for the application of a thin layer of sorbent to the substrate. For example, as illustrated in FIG. 2, the substrate 10 may be dipped in a reservoir 30 (e.g., in the form of a tank) containing the calcium sorbent 25. A clamp 40 is attached to the substrate 10 for maneuvering the substrate through the dipping process. Alternatively, the substrate 10 may be passed over the reservoir 30 as calcium sorbent 25 is dripped or sprayed onto the substrate such that excess sorbent falls into the reservoir for recirculation to the application component (e.g., a sprayer). One or multiple layers may be applied to a substrate. The application method may be adapted to or configured to affect the physical nature of the applied sorbent. The method of applying the calcium sorbent to the substrate can vary as desired to increase throughput; however, certain modes of applying the calcium sorbent may be preferred in relation improving the reactivity of the calcium sorbent with carbon dioxide. For example, blowing of the sorbent onto the substrate may be effective to achieve a coating layer with increased porosity, which can improve the ability to utilize a thicker layer for chemisorption, as described above. In some embodiments, the coating of the calcium sorbent can be specifically characterized in relation to being a substantially continuous layer (or layers) on the substrate. The coating thus may be referenced as being in the form of a thin film, a sheet, a membrane, or the like. A "substantially" continuous coating or indicates that although certain imperfections in the coating or layer (e.g., cracks, divots, and similar defects) are accounted for, the coating is not present in a form of discrete pieces or particles that exist as individual elements (even if the individual elements may be in physical contact with other of the individual elements). Rather, the coating or layer extends along the length of the substrate surface as an intact film, sheet, membrane, or the like. In particular embodiments, the presently disclosed coatings may expressly exclude pelletized, lime-based sorbents or other lime-based sorbents in a particulate form. The use of such, particulate or pelletized sorbents can be disfavored due to the added complexity of forming the particles or pellets, which can require mixing the sorbent with a filler, binder, or the like, and then spray-drying or otherwise processing the mixture to form the discrete, solid particles or pellets. Such particulate materials likewise can require additional processing the adhere to a substrate as well as more complex processing to remove the adhered particles for regeneration. Alternatively, such particles or pellets must be positioned in a packed bed reactor so that air with carbon dioxide can be processed through the packed bed, which again introduces complexity that is not present according to the methodology of the present disclosure.

The substrate itself may have no coatings, or it may have adhesives, anti-adhesion, catalysts, polymers, and other additives applied before application of the calcium sorbent to improve its performance, lifetime, surface area, and/or workability. The substrate surface may be two dimensional (i.e. substantially flat) or three dimensional (i.e. sheared, textured, shaped, curved, etc.) in such a way that improves the application, performance, reactivity, surface area, and workability of the calcium sorbent. Increases in surface area may be sought to accelerate the carbonation reaction, and increases in volume of sorbent per unit of substrate material may be sought to decrease the costs associated with the substrate material. Plastic is one possible substrate material, due to its low costs, structural flexibility, durability and lack of reactivity with calcium. In other embodiments, wood products, foam board, steel, or any such substrate suitable to the purposes.

The substrate may be adapted or configured to be substantially flat when laid on a flat surface or when in a hanging configuration. In other embodiments, the substrate may be intentionally adapted to or configured to have a three dimensional shape as noted above. For example, the substrate may be shaped into a cylinder, cone, or other shapes, and it is advantageous for all exposed sides of the substrate to be coated in the calcium sorbent to increase surface area per unit of substrate material. In some example embodiments, the substrate may be in a rolled configured so as to have a substantially spiral cross-section. In other embodiments, the substrate may be adapted to or configured to have a porous network wherein the pores are sufficiently large to allow not only the liquid sorbent to flow therethrough and coat the surfaces of the substrate but also sufficiently large to allow the carbonated sorbent to be removed from the substrate. For example, honeycomb structures such as are commonly utilized in catalytic converters (e.g., for use in the auto industry or for use in exhaust systems in the power plant industry) may be utilized, and the pore sizes in the honeycomb structure may be suitably sized up to allow for efficient removal of the carbonated sorbent). Such structures are commonly formed from ceramics, but metal honeycombs may be utilized to improve durability.

The substrate may be rotated, moved, spun, air blown, or otherwise manipulated to affect the drying of the calcium sorbent on the substrate material. Likewise, blowers or the like may be utilized to remove excess sorbent from the coated surface and ensure a substantially even and suitably thin coating of the sorbent on the substrate surface. A substrate may be replaced by a rod, a tray, a board, or another substrate that allows for the thin application of calcium sorbent. In some embodiments, the calcium sorbent may be deposited such that it has sufficient structural integrity on its own to hang, stand, or sit without any other substrate or material. Multiple such substrates may be combined in a system to maximize its performance and minimize waste or loss of the sorbent material.

After coating of the sorbent onto one or more substrates, the coated substrate(s) may be moved to a storage unit or facility. The calcium sorbent-coated substrate material can be stored or otherwise positioned for contact with ambient air for a time sufficient to achieve the desired percentage of carbonation of the sorbent as noted above. This time may be referenced as the reaction period or carbonation period. In some embodiments, the reaction period can range from as little as a few hours or up to as much as several months, or longer if required. During the reaction period, the sorbent chemisorbs carbon dioxide from the surrounding air or other concentrated carbon dioxide source. Evaporation will also occur, both from water added into the calcium sorbent, as well as water liberated in the reaction from calcium hydroxide with carbon dioxide to produce calcium carbonate and water. The layer of sorbent will exhibit an initial weight decline during evaporation of the water used in forming the substrate mixture followed by a weight increase from carbonation.

The presently disclosed systems and methods beneficially provide for storage and transportation of the sorbent-coated substrates during the carbonation period in a manner that achieves particularly desirable results. One or more substrates with the calcium sorbent applied thereon may be arranged vertically attached to a conveyor system, hanging stationary from above, supported by other substrates, or held by the sides or bottom of the substrate. This use of vertical space minimizes land area used without significant additional infrastructure and allows for two or more sided drying on a conveyor system or the like. In some embodiments, a conveyor system can be adapted to or configured to move the substrates through the storage unit for at least a portion of or for the entirety of the duration of the carbonation period. This can be structured as one continuous conveyor line, a branching conveyor system, or multiple separate conveyor systems. Horizontal stacking of substrates can also be used in addition to or in replacement of the vertical hanging storage, during and after the initial drying process, and either on or off of a conveyor system.

In one example embodiment, the calcium sorbent may be first applied on a substantially vertical hanging substrate to allow for two-sided application (see FIG. 2) and, after an initial period of carbonation, the partially carbonated sorbent may be removed and positioned on a substantially horizontal conveyor system, which can be effective to allow surface area of the sorbent that was attached to the substrate material to be in contact with ambient air, thus accelerating carbonation. In another example embodiment, the calcium sorbent may be solely applied to a vertical substrate and, after the carbonation period is sufficiently concluded, the at least partially carbonated sorbent may be removed and proceed to calcination for regeneration of the sorbent.

The storage unit or facility can include suitable coverings that are adapted to or configured to protect the calcium sorbent from weather (e.g., rain) that may disrupt the carbonation process. The storage unit or facility may or may not be closed to the air, depending on the climate in the region. Temperature, relative humidity, and air flow of the storage space may be controlled to optimize carbonation, or they may be left to fluctuate with ambient conditions. As such, the storage unit or facility may include suitable climate control elements, air intakes, and the like that are adapted to or configured to provide an in-flow of ambient air for carbon dioxide removal. For example, a storage unit or facility may include one or more air movers (e.g., fans, blowers, or the like) configured to or adapted to increase air circulation in the storage unit or facility and ensure that carbon dioxide concentration in the air proximate to the calcium sorbent do not fall below a range that may reduce process efficiency (e.g., average ambient air $CO_2$ content for air entering the facility minus 5%, minus 10%, minus 15%, or minus 20%). As another example, a storage unit or facility may include one or more heaters and/or one or more coolers configured to or adapted to regulate temperature to a desired range for improving process efficiency. As still another example, a storage unit or facility may include one or more humidity regulators, which may be configured to or adapted to maintain relative humidity (RH) in the storage unit or facility within a desired range (e.g., greater than 40% RH, greater than 50% RH, or greater than 60% RH, such as in the range of about 45% to about 90%, about 45% to about 80%, or about 50% to about 75% RH) suitable to improve process efficiency. Additionally, excess carbon dioxide (or other gases) beyond the content present in ambient air may be fed into the storage unit to accelerate carbonation in some embodiments. In some embodiments, the storage unit or facility may incorporate natural terrain features such as canyons, water courses, cliffs, or caves to make the air flow, air temperature, and/or air humidity more suitable for process performance.

After the calcium sorbent has achieved sufficient carbonation within a desired range, the captured carbon dioxide can be further processed for storage. In some embodiments, carbonated sorbent may be removed from the substrate material for further processing. In other embodiments, a substrate material may be adapted to or configured to be stored geologically with the carbonated sorbent, or the substrate may be suitable for being processed through the calciner with the carbonated sorbent. Thus, the substrate may be reusable or may be sacrificial. Where removal is utilized, removing at least a portion of the calcium sorbent in the carbonated form from the one or more substrates can include subjecting the one or more substrates to a force sufficient to break the coating layer of the calcium sorbent material and loosen the coating layer of the calcium sorbent material from the one or more substrates. Breaking can indicate breaking into a plurality of pieces for ease of processing, and breaking the coating layer can improve the ability to easily loosen the coating layer from the substrate.

A flexible substrate may be utilized so that bending/flexing of the substrate may be sufficient to remove the substantially brittle, carbonated sorbent. As such, subjecting the substrate to a force sufficient to break and loosen the coating layer can include any force that will cause the substrate to bend and/or flex. Alternatively, or additionally, the force to which the substrate may be subjected can include shaking, scraping, blowing, vibrating, rolling, squeeze rolling, shock impulse, electrostatic impulse, electromagnetic impulse, magnetic, and/or a variety of other methods for removing the carbonated sorbent from the substrate material. Mechanical force may be desirable in some embodiments since various forms of mechanical force may be applied in a cost-efficient manner. In other embodiments, sound or shock forces/impulses may be more easily applied. In some embodiments, removal of sorbent may be enhanced by various compositional and/or surface treatments of the substrate. Once removed, the sorbent material may be given additional time to carbonate given that additional surface area has been freshly exposed, or it may be substantially immediately processed.

The carbonated sorbent may be regenerated for reuse by passage through a calciner in substantially the same manner as described above for preparing the original calcium sorbent material. After carbonation, the sorbent material, which was originally a first chemical composition (e.g., as calcium hydroxide and/or calcium oxide) has been converted to a different chemical composition-namely calcium carbonate. The calcium carbonate can be processed through the calciner with carbon capture. By once again heating up the calcium carbonate to a temperature that is above about 800° C., carbon dioxide is released and then captured, for sequestration and utilization. The captured carbon dioxide is substantially or completely carbon dioxide that was withdrawn from the ambient air. In addition, calcium oxide is once again formed, which can be fed back in again as the input for the calcium sorbent, reducing the need for additional limestone input.

This re-calcining (or regeneration) portion of the process shares similarities with calcium looping. Unlike calcium looping, no carbonator is needed, as carbonation occurs through prolonged exposure to the air. The behavior of calcium as it is looped is well understood, and calcium oxide is known to continue chemisorbing carbon dioxide as it is looped from calcium oxide to calcium carbonate and back to calcium oxide, but also to lose its reactivity after some number of loops. For example, carbonation conversion can drop to under 50% after as few as five looping cycles with a calciner and a carbonator in succession. The currently disclosed systems and methods, however, can mitigate such sorbent deactivation. In particular, by at least partially slaking the calcium oxide, water is able to facilitate the reaction between calcium oxide and carbon dioxide. Further, elimination of the carbonation reactor (which is typically operated at about 650° C.) mitigates attrition and sinter issues. Still further, the residence time of the calcium hydroxide and carbon dioxide reaction in the current systems and methods is significantly longer than residence time of calcium oxide and carbon dioxide in a typical high temperature carbonator. The cycles between carbonation and calcination can be from a few cycles to hundreds of cycles, to reduce the cost of limestone.

To the extent that calcium sorbent deactivation may occur so that efficiency drops to a defined level, such deactivated sorbent may be disposed of either in the form of any one or more of CaO, $Ca(OH)_2$, and $CaCO_3$. The waste material may be utilized as products, for industries such as cement, agriculture, or road aggregate, where chemically similar CaO and limestone are used as inputs. Alternatively, the waste can be processed for disposition of the material. To the extent that $CaCO_3$ is disposed, it will also serve as mineral sequestration for carbon dioxide from the air, keeping it from the atmosphere for millennia in the form of stone. As such, at least a portion of the calcium carbonate removed from the substrate(s) after carbonation has been carried out may be disposed of in a manner that sequesters the captured carbon dioxide. In some cases, the calcium sorbent may skip the re-calcination stage after the very first carbonation, and be immediately stored as in the ground as a stable non-toxic mineral, $CaCO_3$, which is formed during carbonation. Because of the passive low input system developed herein, this mineral carbon dioxide storage is potentially attractive in regions with low cost limestone and inadequate geology for traditional carbon dioxide sequestration.

An example embodiment of an overall system and method according to the present disclosure is provided in FIG. 3. As shown therein, the example systems and methods can utilize relatively tall substrates (e.g., "sheets") that are dipped into a reservoir (i.e., a "dipping vat") containing the liquid, calcium sorbent (e.g., in the form of calcium hydroxide) as they are transported by a vertical conveyor. Those substrates are hanging from the ceiling, and the conveyor transports them during carbonation until the carbonated sorbent is removed for further processing.

In the embodiment of FIG. 3, a coating system 32 may include a dipping unit 35 for dipping of the substrates 10 (e.g., the hanging sheets) into the reservoir 30 (e.g., the dipping vat). The dipping unit 35 may comprise a portion of the vertical conveyors 50 that are angularly oriented to allow the substrates 10 to move downward into the reservoir 30 and then upward out of the reservoir. The coating system 32 may comprise further components in addition to the reservoir 30, such as sprayers or drip components, for applying the calcium sorbent by methods other than dipping. In other embodiments, the dipping unit 35 may comprise additional components configured for individually lowering individual substrates 10 into the reservoir 30. The substrates 10 exiting the dipping unit are in the form of coated substrates 52 (e.g., lime coated sheets) with a layer of the calcium sorbent coated thereon. The coated substrates 52 are then positioned in a storage unit 54. The storage unit 54 may consist essentially of the conveyors 50 in a sheltered location between the dipping unit 35 and the collection unit 60. Alternatively, the storage unit 54 may be a building or room(s) in a building where the coated substrates 52 can be subjected to carbonation wherein ambient $CO_2$ from air reacts with the calcium sorbent and water evaporates from the calcium sorbent. After sufficient carbonation has occurred, the coated substrates 52 are moved to the collection unit 60 (e.g., the lime removal unit). Therein, the carbonated calcium sorbent is removed from the substrates 10. The substrates 10 are released for re-use in the dipping unit 35, and the carbonated calcium sorbent (which can include $CaCO_3$ and unreacted $Ca(OH)_2$) is moved along a horizontal conveyor 65 during which time partially carbonized calcium sorbent can undergo further carbonization such that at least a portion of the unreacted calcium hydroxide is carbonated. All or part of the carbonated calcium sorbent can be removed for disposal such that the carbon dioxide removed from the air is sequestered in the formed calcium carbonate. All or part of the carbonated calcium sorbent likewise can be sent to a calciner 70 where carbon dioxide can be liberated to again form calcium oxide, which can be removed in a solids separator 75 to provide calcium oxide to a lime slaker 80 to form the calcium hydroxide slurry for input to the reservoir 30 for use as the calcium sorbent.

FIG. 3 illustrates a fully implementable system and method for carbon dioxide capture, but it is understood that only portions of the illustrated components and steps may be implemented to carry out different embodiments of the present disclosure. Thus, FIG. 3 is provided such that a skilled person utilizing the present disclosure may immediately recognize various combinations of the illustrated components and steps to achieve the different embodiments. For example, in one or more embodiments, the method and system illustrated in FIG. 3 may be implemented under one or more of the following conditions.

The calciner 70 and the solids separator 75 may be absent from the system. Instead, calcium oxide may be input directly to the lime slaker 80. In such embodiments, lime removed from the substrates in the collection unit 60 may be exported for sequestration and/or for delivery to a third party for re-calcination with carbon capture. Likewise, the lime slaker 80 may be absent, and calcium hydroxide may be sourced directly for input to the reservoir 30.

The reservoir 30 may be replaced with any further components suitable for applying the calcium sorbent to the substrates 10.

The "sheets" may be replaced with any other, suitable substrate material as otherwise described herein.

The lime coated sheets 52 may be circulated through the vertical conveyors for carbonation without any intermediate processing in the collection unit 60.

The $CaCO_3$ and $Ca(OH)_2$ withdrawn from the collection unit 60 may be sent directly to re-calcination without undergoing additional carbonation.

The processing may be substantially continuous in that application of calcium sorbent, processing of the coated substrates for carbonation, and removal of the carbonated sorbent in the collection unit 60 may be carried out without interruption other than requisite maintenance or scheduled downtime. For example, the scale of the system may be sufficiently large such that a single substrate may only cycle from exiting the coating system 32 to re-entry to the coating system over a length of time that is sufficient for the desired level of carbonation to occur. This may be on the order of several hours to several days. As such, the system may be continuously operated.

The vertical conveyor may include a sitting station at some point between the coating system 32 and the collection unit 60. In this manner, coated substrates 52 may be off-loaded in the sitting station for carbonation to occur while other substrates are processed through the system. The sitting station may be intermittently completely or partially emptied of coated substrates that have already undergone carbonation and re-populated with freshly coated substrates.

The process may be operated in a batch mode wherein substrates are coated as a batch, stored for carbonation as a batch, and then processed for lime removal as a batch.

The process may be operated through multiple coating and carbonation steps without removal of the coating layer from the substrate. For example, a substrate may be coated with a relatively thin layer of the calcium sorbent material, processed to allow carbonation to occur, re-coated so that an additional, relatively thin layer of the calcium sorbent material is added over the carbonized layer, and so on until a relatively thick coating of multiple, separately carbonized layers are present on the substrate. The coated substrate may then be subject to removal of the coating layers.

Figure 4:
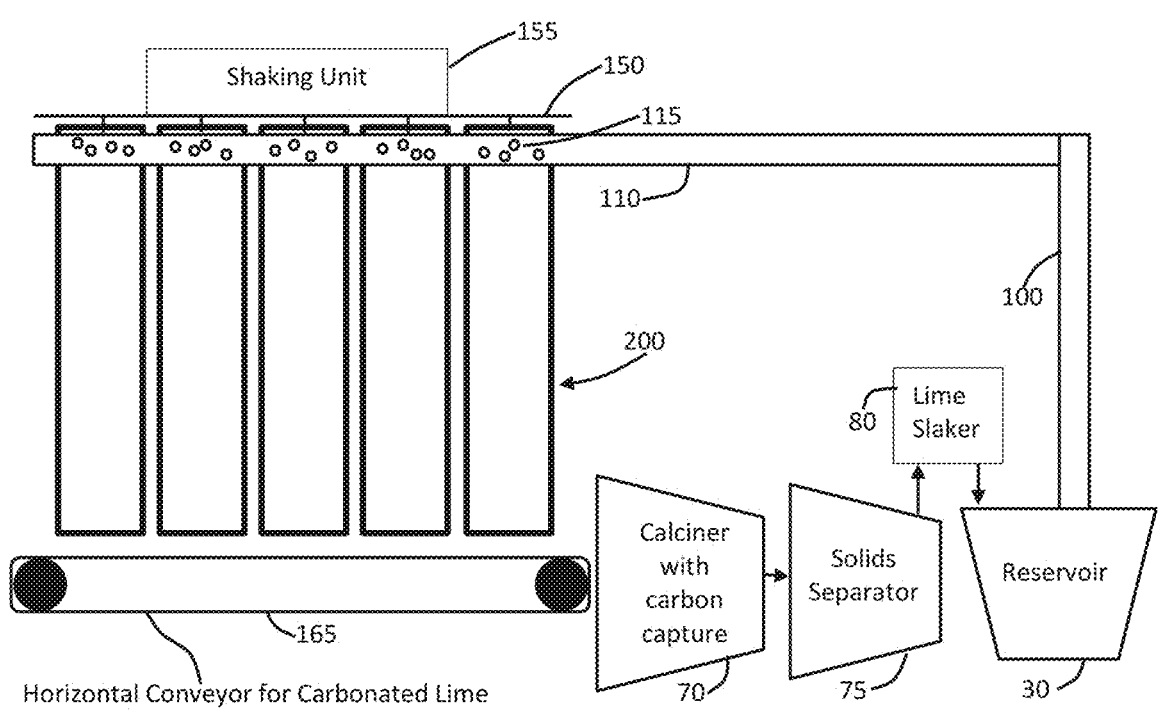
FIG. 4 is a flowchart showing details of an example of coating and removal of a sorbent in a system and method for direct air capture of carbon dioxide according to example embodiments of the present disclosure.
Figure 5:
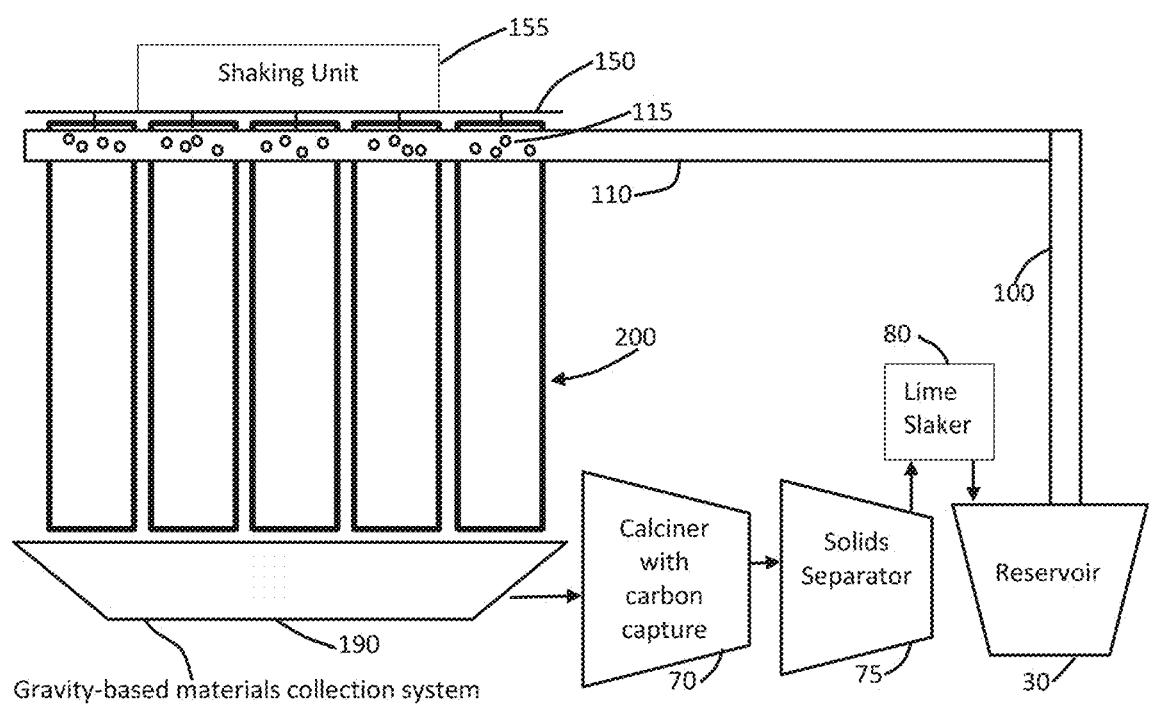
FIG. 5 is a flowchart showing detail of a further example of coating and removal of a sorbent in a system and method for direct air capture of carbon dioxide according to example embodiments of the present disclosure.

Further example embodiments are illustrated in FIG. 4 and FIG. 5. With reference to FIG. 4, the core system as illustrated in FIG. 3 can remain substantially unchanged, but the vertical conveyor system can be replaced with stationary sheets. In such embodiments, calcium sorbent can be applied through a pipe and drip system such that the substrates remain stationary while the calcium sorbent is moved through the system first in the form of calcium hydroxide and second in the form of carbonated lime. In FIG. 4, the calcium sorbent can be pumped or otherwise conveyed from a reservoir 30 through one or more lines 100 to one or more drip pipes 110 including one or more perforations 115 for dripping fresh calcium sorbent onto the substrates 200. After the calcium sorbent has undergone carbonation, the carbonated lime may be removed from the substrates 200 (e.g., via a shaking system 155 integrated with the hanging unit 150) such that the carbonated lime falls onto a horizontal conveyor 165. The conveyor can be configured to deliver carbonated lime to a calciner 70 with carbon capture, which can be linked to a solids separator 75 and a lime slaker 80 to deliver calcium sorbent to the reservoir 30, similarly to what is illustrated in FIG. 3. Carbon dioxide and material flows are not shown in FIG. 4, but it is understood that such material flows can be substantially identical to what is described in relation to FIG. 3.

The embodiment of FIG. 3 can be modified to yield further example embodiments for implementation of a system and method as described herein. For example, as illustrated in FIG. 5, the elements of the drip system from FIG. 4 remain, but a gravity based collection system 190 is utilized to replace the horizontal conveyor. After carbonated sorbent is removed from the substrates 200, it falls onto a slanted surface of the gravity-based collection system 190 such that the solid product will collect in high enough density to allow for easy transport back into the calciner 70.

The present systems and methods can achieve net carbon removal from the atmosphere because the net capture of $CO_2$ from the air by the calcium sorbent is greater than any $CO_2$ emissions from the process. Net carbon flow in an example embodiment of the present disclosure is shown in the following Table for a system with a 90% carbon capture calciner and an 85% calcium sorbent carbonation rate.

TABLE

| | |
|---|---|
| $CO_2$ captured per ton of CaO in sorbent | 0.67 tons |
| $CO_2$ emitted by calciner per MT of CaO produced. | 0.091 tons |
| All other embodied $CO_2$ emissions, per metric ton of CaO produced | .01 tons |
| Net $CO_2$ removal from atmosphere per metric ton of CaO processed | .57 tons |
| Net direct air capture $CO_2$ per metric ton of CaO | 0.65 tons |
| Land required per metric ton of net direct air capture $CO_2$ | .00024 acres |

Experimental data has demonstrated the ability to achieve >70% carbonation over a time period of approximately 3 days, with 0.3 kg of calcium sorbent per square meter of exposed area. This pace and conversion rate would allow for approximately 100,000 metric tons (MT) of net direct air capture to occur using less than 25 acres of land. This land use intensity is well below what's required to enable billions of tons of $CO_2$ to be captured from the air without impinging on other land uses or running out of suitable area near limestone and $CO_2$ storage.

Many modifications and other embodiments of the invention will come to mind to one skilled in the art to which this invention pertains having the benefit of the teachings presented in the foregoing descriptions and associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

Use of the words "about" and "substantially" herein are understood to mean that values that are listed as "about" a certain value or "substantially" a certain value may vary by an industry recognized tolerance level for the specified value. When an industry recognized tolerance is unavailable, it is understood that such terminology may indicate that an acceptable value may be vary ±3%, ±2%, or ±1% from the specifically listed value. Likewise, in some embodiments, the listed value may be exact, if desired, and variations above or below the listed value may be expressly excluded.

The invention claimed is:

1. A method for direct air capture of carbon dioxide, the method comprising:
   applying a calcium sorbent material on a substrate to define a layer of the calcium sorbent material on a surface of the substrate at a density of about 0.1 kilograms per square meter to about 5 kilograms per square meter;
   subjecting the substrate with the layer of the calcium sorbent material to contact with air including carbon dioxide for a time sufficient for the calcium sorbent to react with the carbon dioxide and thereby capture at least a portion of the carbon dioxide from the air and convert at least a portion of the calcium sorbent to a carbonated calcium;
   removing at least a portion of the carbonated calcium from the substrate by subjecting the substrate to a force effective to cause at least a portion of the carbonated calcium to break and loosen from the substrate; and
   processing the carbonated calcium such that the carbon dioxide captured from the air is ready for sequestration or other use.

2. The method of claim 1, wherein the layer of the calcium sorbent material on the surface of the substrate is at a thickness of less than 2.5 cm.

3. The method of claim 1, wherein the layer of the calcium sorbent material on the surface of the substrate has an average thickness of about 0.01 mm to about 2 cm.

4. The method of claim 1, wherein the substrate is configured substantially as a sheet.

5. The method of claim 4, wherein the sheet is flexible.

6. The method of claim 4, wherein the sheet is non-porous.

7. The method of claim 1, wherein the layer of the calcium sorbent material is configured to exhibit a carbonation rate such that at least 25% by weight of the calcium sorbent material is carbonated within a time of 96 hours or less.

8. The method of claim 1, wherein the layer of the calcium sorbent material is configured to exhibit a carbonation rate such that at least 50% by weight of the calcium sorbent material is carbonated within a time of about 1 day to about 14 days.

9. The method of claim 1, wherein subjecting the substrate with the layer of the calcium sorbent material to contact with air including carbon dioxide comprises hanging the substrate in a location where the layer of the calcium sorbent material is in contact with the air.

10. The method of claim 1, wherein force to which the substrate is subjected is effective to cause the substrate to one or both of bend and flex.

11. The method of claim 1, wherein processing the carbonated calcium comprise particularizing the carbonated calcium for sequestration of the carbonated calcium.

12. The method of claim 1, wherein processing the carbonated calcium comprises further subjecting the carbonated calcium to ambient air for a time sufficient to increase carbonation percentage.

13. The method of claim 1, wherein processing the carbonated calcium comprises:
   calcining the carbonated calcium to release carbon dioxide therefrom and form calcium oxide; and
   capturing the carbon dioxide released from the calcium sorbent.

14. The method of claim 13, further comprising removing a portion of the carbonated calcium prior to the calcining.

15. The method of claim 14, further comprising adding limestone prior to or during the calcining.

16. The method of claim 1, further comprising slaking calcium oxide to form the calcium sorbent material.

17. The method of claim 1, wherein preparing the layer of the calcium sorbent material comprises dipping the substrate in a reservoir of the calcium sorbent material.

18. The method of claim 1, wherein preparing the layer of the calcium sorbent material comprises dripping or spraying the calcium sorbent material onto the substrate.

19. The method of claim 1, wherein the layer of the calcium sorbent material is continuous across the surface of the substrate.

20. The method of claim 1, where the air including carbon dioxide has a relative humidity (RH) of 40% RH or greater.

21. A method for direct air capture of carbon dioxide, the method comprising:
   preparing a substantially continuous coating layer of a calcium sorbent material at a density of less than 10 kilograms per square meter on one or more substrates;
   subjecting the one or more substrates with the substantially continuous coating layer of the calcium sorbent material to contact with air including carbon dioxide and having a relative humidity (RH) of 40% RH or greater for a time sufficient for the calcium sorbent to react with the carbon dioxide and thereby capture at least a portion of the carbon dioxide from the air and convert at least a portion of the calcium sorbent to a carbonated form;
   removing at least a portion of the calcium sorbent in the carbonated form from the one or more substrates; and
   processing the calcium sorbent in the carbonated form such that the carbon dioxide captured from the air is ready for sequestration or other use.

* * * * *